(12) United States Patent
Murata (10) Patent No.: US 8,506,098 B2
(45) Date of Patent: Aug. 13, 2013

(54) MOUNTING PORTION STRUCTURE OF DOOR MIRROR

(75) Inventor: Yoshihiro Murata, Fujieda (JP)

(73) Assignee: Murakami Corporation, Shizuoka (JP)

( * ) Notice: Subject to any disclaimer, the term of this patent is extended or adjusted under 35 U.S.C. 154(b) by 435 days.

(21) Appl. No.: 12/831,344

(22) Filed: Jul. 7, 2010

(65) Prior Publication Data

US 2011/0051272 A1    Mar. 3, 2011

(30) Foreign Application Priority Data

Aug. 31, 2009 (JP) ................. 2009-200840

(51) Int. Cl.
*G02B 7/182* (2006.01)
*B60R 1/06* (2006.01)

(52) U.S. Cl.
CPC ...................................... *B60R 1/06* (2013.01)
USPC ........................................ 359/871; 248/466

(58) Field of Classification Search
None
See application file for complete search history.

(56) References Cited

U.S. PATENT DOCUMENTS 7,156,449 B2 * 1/2007 Vijaywargiya et al. .... 296/146.6

FOREIGN PATENT DOCUMENTS

| JP | 59-079438 | 5/1984 |
|---|---|---|
| JP | 06-000945 | 1/1994 |
| JP | 07-223490 | 8/1995 |
| JP | 08-169280 | 7/1996 |
| JP | 2003-267131 | 9/2003 |
| JP | 2007-126070 | 5/2007 |
| JP | 2007-331601 | 12/2007 |
| JP | 2008-032040 | 2/2008 |

OTHER PUBLICATIONS

Japanese Decision to Grant a Patent dated Apr. 9, 2013 along with an English language translation thereof.

* cited by examiner

*Primary Examiner* — Scott J Sugarman
*Assistant Examiner* — Robert E Tallman
(74) *Attorney, Agent, or Firm* — Greenblum & Bernstein, P.L.C.

(57) ABSTRACT

A mounting portion structure for stably temporarily fixing a door mirror is provided. Two temporary fixing pieces are formed to protrude on a gasket. Pawls are formed to direct outward at tips of the two temporary fixing pieces. The gasket is previously secured to the mirror base by a screw. The two temporary fixing pieces are inserted through an opening in a mirror mounting portion of a vehicle, and the pawls of the temporary fixing pieces are locked to facing edges of the opening to temporarily fix the mirror base to the mirror mounting portion. Then, the mirror base and the mirror mounting portion are permanently fixed by a screw.

8 Claims, 4 Drawing Sheets

MOUNTING PORTION STRUCTURE OF DOOR MIRROR

The disclosure of Japanese Patent Application No. JP2009-200840 filed on Aug. 31, 2009 including the specification, drawings, claims and abstract is incorporated herein by reference in its entirety.

BACKGROUND OF THE INVENTION

1. Field of the Invention

The present invention relates to a mounting portion structure for mounting a door mirror to a vehicle so that the door mirror can be stably temporarily fixed.

2. Description of the Related Art

Conventionally, in mounting a door mirror to a vehicle, the door mirror is temporarily fixed to a mirror mounting portion of a vehicle door, and then both are permanently fixed by a screw. A structure for temporarily fixing a door mirror is described in Japanese Patent Laid-Open No. 2007-331601. This structure is such that one temporary fixing piece having a pawl in a gasket is formed, and the temporary fixing piece is inserted and locked in a locking hole formed in a mirror mounting portion of a vehicle to temporarily fix a door mirror.

Temporary fixing with the one temporary fixing piece described in Japanese Patent Laid-Open No. 2007-331601 is unstable, and a heavy door mirror may fall off because the temporary fixing is released.

The present invention is achieved in view of the above-described points, and has an object to provide a mounting portion structure of a door mirror for stably temporarily fixing the door mirror.

SUMMARY OF THE INVENTION

A mounting portion structure according to the present invention is a structure in which a mirror base of a door mirror is mounted via a gasket to a mounting surface on an outdoor side of a mirror mounting portion placed on a vehicle door, wherein the gasket includes two temporary fixing pieces formed to protrude to face each other with a space therebetween on a surface facing the mirror mounting portion, and pawls formed to direct outward at tips of the two temporary fixing pieces, the mirror mounting portion includes an opening through which the two temporary fixing pieces are inserted and that locks and temporarily fixes the pawls of the temporary fixing pieces to facing edges, the gasket is previously secured to the mirror base, the mirror base is temporarily fixed to the mirror mounting portion, and the mirror base and the mirror mounting portion are fixed by a screw to mount the mirror base to the mirror mounting portion. According to this, the pawls of the two temporary fixing pieces can be locked to the edges of the opening to stably temporarily fix the mirror base to the mirror mounting portion. In this state, the mirror base and the mirror mounting portion can be fixed by a screw to mount the mirror base to the mirror mounting portion.

A mounting portion structure according to the present invention is a structure in which a mirror base of a door mirror is mounted via a gasket to a mounting surface on an outdoor side of a mirror mounting portion placed on a vehicle door, wherein the mirror base includes upper and lower screw rods provided to stand with a space therebetween on a surface facing the mirror mounting portion, the gasket includes upper and lower screw rod insertion holes through which the upper and lower screw rods are inserted, two temporary fixing pieces formed to protrude to face each other with a lateral space therebetween on the surface facing the mirror mounting portion in a position between the upper and lower screw rod insertion holes, and pawls formed to direct outward at tips of the two temporary fixing pieces, the mirror mounting portion includes a screw rod insertion hole through which the lower screw rod protruding through the lower screw rod insertion hole in the gasket is inserted, a screw rod insertion hole through which the upper screw rod protruding through the upper screw rod insertion hole in the gasket is inserted, and an opening through which the two temporary fixing pieces are inserted and that locks and temporarily fixes the pawls of the temporary fixing pieces to laterally facing edges in a position below the upper screw rod, the gasket is previously secured to the mirror base, the mirror base is temporarily fixed to the mirror mounting portion, and nuts are threaded and fastened onto the screw rods exposed to an indoor side of the mirror mounting portion to mount the mirror base to the mirror mounting portion. According to this, the pawls of the two temporary fixing pieces can be locked to the laterally facing edges of the opening to stably temporarily fix the mirror base to the mirror mounting portion. In this state, the nuts can be threaded and fastened onto the screw rods protruding on the indoor side of the mirror mounting portion to mount the mirror base to the mirror mounting portion. The two temporary fixing pieces can be placed in a position closer to the upper screw rod among the upper and lower screw rods to allow the mirror base to be more stably temporarily fixed.

A mounting portion structure according to the present invention is a structure in which a mirror base of a door mirror is mounted via a gasket to a mounting surface on an outdoor side of a mirror mounting portion placed on a vehicle door, wherein the mirror base includes upper and lower screw rods provided to stand with a space therebetween and a boss provided to stand on a portion above the upper screw rod on a surface facing the mirror mounting portion, the gasket includes a boss insertion hole through which the boss is inserted, upper and lower screw rod insertion holes through which the upper and lower screw rods are inserted, two temporary fixing pieces formed to protrude to face each other with a lateral space therebetween on the surface facing the mirror mounting portion in a position between the upper and lower screw rod insertion holes, and pawls formed to direct outward at tips of the two temporary fixing pieces, the mirror mounting portion has a structure in which an outer plate placed on the outdoor side and an inner plate placed on an indoor side are placed to face each other with an appropriate space therebetween, the outer plate includes a boss insertion hole through which the boss protruding through the boss insertion hole in the gasket is inserted, a screw rod insertion hole through which the lower screw rod protruding through the lower screw rod insertion hole in the gasket is inserted, and an opening through which the upper screw rod protruding through the upper screw rod insertion hole in the gasket and the two temporary fixing pieces are inserted together and that locks and temporarily fixes the pawls of the temporary fixing pieces to laterally facing edges, the inner plate includes a screw rod insertion hole through which the upper screw rod protruding through the opening in the outer plate is inserted, and an opening through which the lower screw rod protruding through the screw rod insertion hole in the outer plate is exposed to the indoor side, with the gasket previously secured to the mirror base, the boss of the mirror base is inserted through the boss insertion hole in the outer plate, the lower screw rod is inserted through the screw rod insertion hole in the outer plate, the upper screw rod is inserted through the screw rod insertion hole in the inner plate through the opening in the outer plate, the two temporary fixing pieces are inserted through the opening in the outer plate and the pawls of the temporary fixing pieces are locked to the laterally facing edges of the opening to temporarily fix the mirror base to the mirror mounting portion, a nut is threaded and fastened onto the upper screw rod protruding through the screw rod insertion hole in the inner plate with the mirror base being temporarily fixed to the mirror mounting portion, and a nut is threaded and fastened onto the lower screw rod protruding through the screw rod insertion hole in the outer plate and exposed through the opening in the inner plate to mount the mirror base to the mirror mounting portion. According to this, by pressing the mirror base against the mirror mounting portion with the mirror base being positioned on the mirror mounting portion by the boss and the screw rods, and thus the pawls of the two temporary fixing pieces can be locked to the laterally facing edges of the opening to stably temporarily fix the mirror base to the mirror mounting portion. In this state, the nuts can be threaded and fastened onto the screw rods protruding on the indoor side of the mirror mounting portion to mount the mirror base to the mirror mounting portion. The mirror mounting portion has the structure in which the outer plate and the inner plate are placed to face each other with the appropriate space therebetween, thereby increasing rigidity of the door and allowing the door mirror to be firmly supported. The upper screw rod and the two temporary fixing pieces are inserted together through the opening in the outer plate, and thus the two temporary fixing pieces can be placed in a position close to the upper screw rod, that is, a position in a relatively upper portion of the mirror base, thereby allowing the door mirror to be stably temporarily fixed. In the mounting portion structure, the lower screw rod may consist of two screw rods arranged in the lateral direction and the screw rod insertion hole in the outer plate may consist of two holes through which the two screw rods are inserted, one of the two screw rod insertion holes in the outer plate through which the two screw rods are inserted is formed into an oval shape having a long diameter in a direction of a line connecting the one screw rod insertion hole and the boss insertion hole and a short diameter in a direction perpendicular to the line, the short diameter is sized so that the screw rod inserted through the screw rod insertion hole cannot be moved in a direction of the short diameter and the long diameter is sized so that the screw rod inserted through the screw rod insertion hole can be moved in a direction of the long diameter, the other of the two screw rod insertion holes is formed into a circular shape sized so that the screw rod inserted through the screw rod insertion hole can be radially moved, and the boss insertion hole in the outer plate is sized so that the boss inserted through the boss insertion hole cannot be radially moved. According to this, one of the lower left and right screw rods can be engaged with the screw rod insertion hole having the oval shape with the boss being engaged with the boss insertion hole, thereby allowing the mirror base to be easily positioned on the mirror mounting portion.

A mounting portion structure according to the present invention is a structure in which a mirror base of a door mirror is mounted via a gasket to a mounting surface on an outdoor side of a substantially triangular mirror mounting portion placed on a vehicle door, wherein the mirror base has a structure in which one upper screw rod, two lower left and right screw rods, and one boss on a portion above the upper screw rod are provided to stand on a substantially triangular surface facing the mirror mounting portion, the gasket includes a boss insertion hole through which the boss is inserted, upper and lower screw rod insertion holes through which the upper and lower screw rods are inserted, two temporary fixing pieces formed to protrude to face each other with a lateral space therebetween on the surface facing the mirror mounting portion in a position between the upper and lower screw rod insertion holes, and pawls formed to direct outward at tips of the two temporary fixing pieces, the mirror mounting portion includes a boss insertion hole through which the boss protruding through the boss insertion hole in the gasket is inserted, two screw rod insertion holes through which the two lower screw rods protruding through the lower screw rod insertion hole in the gasket are inserted, a screw rod insertion hole through which the one upper screw rod protruding through the upper screw rod insertion hole in the gasket is inserted, and an opening through which the two temporary fixing pieces are inserted and that locks and temporarily fixes the pawls of the temporary fixing pieces to laterally facing edges in a position below the upper screw rod, the one boss and the three screw rods are inserted midway into the insertion holes in the mirror mounting portion to abut front end surfaces of the pawls of the two temporary fixing pieces against the laterally facing edges of the opening, in this state, the mirror base is pressed against the mirror mounting portion to lock the pawls of the two temporary fixing pieces to the laterally facing edges of the opening beyond the laterally facing edges to temporarily fix the mirror base to the mirror mounting portion, and nuts are threaded and fastened onto the three screw rods with the mirror base being temporarily fixed to the mirror mounting portion to mount the mirror base to the mirror mounting portion. According to this, by pressing the mirror base against the mirror mounting portion with the mirror base being positioned on the mirror mounting portion by the boss and the screw rods, the door mirror can be easily and stably temporarily fixed.

In the present invention, ribs may be formed on facing surfaces of the two temporary fixing pieces. According to this, the ribs increase rigidity of the temporary fixing pieces, thereby preventing the gasket from being bent by a weight of the door mirror, and more reliably preventing the pawls from being disengaged from the edges of the opening and preventing the door mirror from falling off. Lower portions of the ribs may be connected by a rib connecting portion constituted by a ridge, thereby increasing rigidity of a plate surface of the gasket in the rib connecting portion to further prevent the pawls from being disengaged from the edges of the opening.

DETAILED DESCRIPTION OF THE PREFERRED EMBODIMENTS

Figure 2:
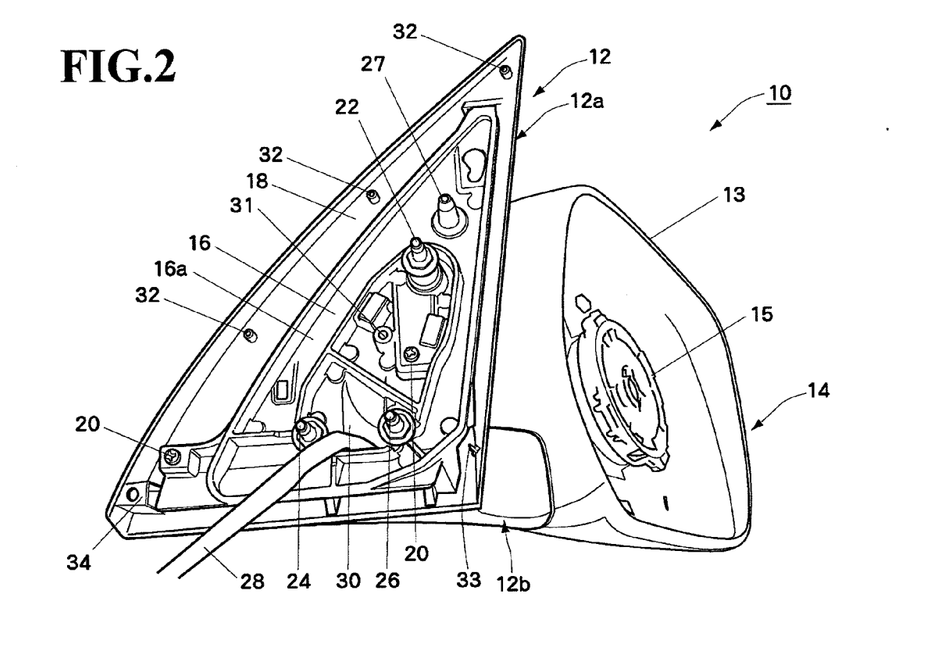
FIG. 2 is a perspective view of the door mirror.

An embodiment of the present invention will be described. FIG. 2 shows a door mirror. The door mirror 10 includes a mirror base 12 and a mirror main body 14. The mirror main body 14 includes a frame (not shown) made of die-cast metal or glass fiber reinforced rigid plastic mounted and supported in a plastic housing 13, a mirror surface angle adjusting actuator 15 is mounted and supported on the frame, and a mirror (not shown) is mounted and supported on a front surface of the mirror surface angle adjusting actuator 15. The mirror base 12 includes a vehicle body securing portion 12a which is to be secured to a vehicle body and a rotation support portion 12b that protrudes outward from a lower portion of the vehicle body securing portion 12a and rotatably supports the mirror main body 14 between a use position and a retracted position (a non-use position). The vehicle body securing portion 12a of the mirror base 12 has a triangular mounting surface so as to be placed in a triangular corner of a front door of a vehicle. The mirror base 12 includes therein a base body 16 made of die-cast metal or glass fiber reinforced rigid plastic, and a plastic cover 18 is placed over an outside of the base body 16. The base body 16 and the cover 18 are connected and secured to each other by a plurality of screws 20. The base body 16 is connected to the frame of the mirror main body 14 in the rotation support portion 12b, and rotatably supports the frame of the mirror main body 14 between the use position and the retracted position.

Figure 5:
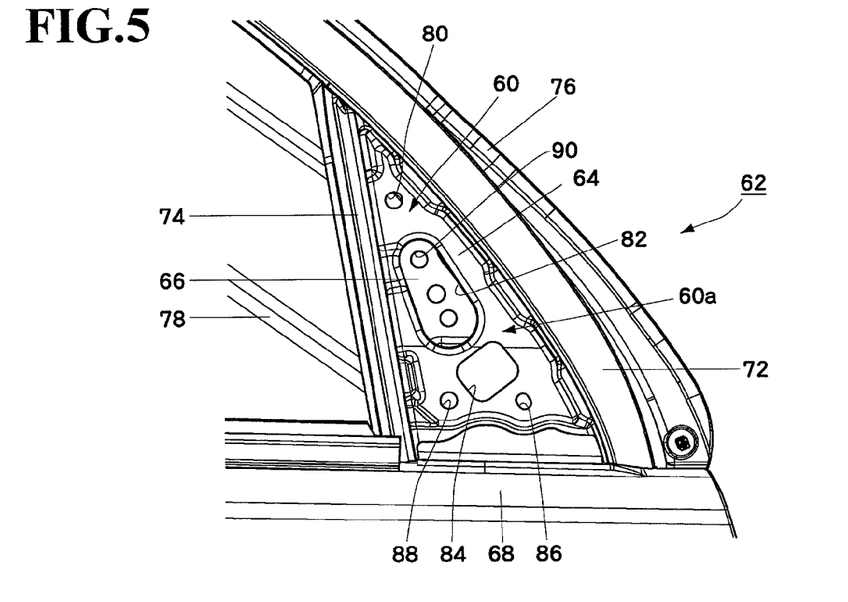
FIG. 5 is a perspective view of a mirror mounting portion 60 of a vehicle to which the door mirror 10 in FIG. 2 is to be mounted, viewed from an outdoor side.
Figure 6:
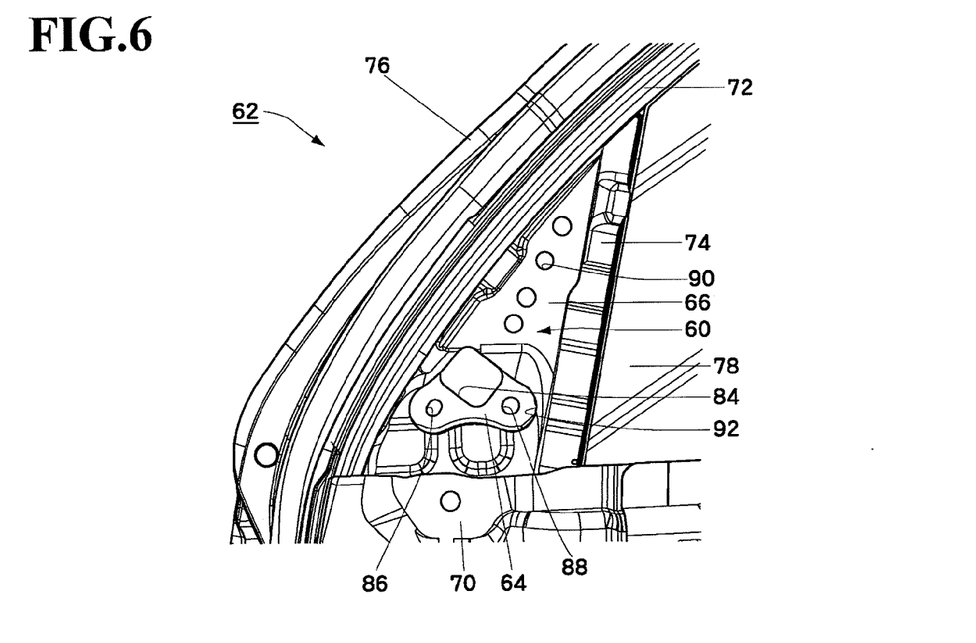
FIG. 6 is a perspective view of the mirror mounting portion 60 of the vehicle to which the door mirror 10 in FIG. 2 is to be mounted, viewed from an indoor side.

On a vehicle body mounting surface 16a of the base body 16, one upper screw rod 22 and two lower screw rods 24 and 26 for securing to the vehicle body are secured to stand perpendicularly to the vehicle body mounting surface 16a. On the vehicle body mounting surface 16a, a positioning boss 27 is formed to protrude perpendicularly to the vehicle body mounting surface 16a in an upper position of the upper screw rod 22. In the vehicle body mounting surface 16a of the base body 16, a hole 30 is provided through which a harness 28 for supplying power for motor-driven retraction and mirror surface angle adjustment to the mirror main body 14 is inserted. In the vehicle body mounting surface 16a of the base body 16, a screw hole 31 is formed into which a screw 58 (FIG. 4) for securing a gasket 36 (FIG. 3) to the base body 16 is screwed. In an inner surface near a peripheral edge of the cover 18, a plurality of bosses 32, one protrusion 33, and one locking portion 34 each for fastening a peripheral edge of the gasket 36 (FIG. 3) are formed to protrude. Tips of the screw rods 22, 24 and 26 are each formed to have a small diameter without a thread so as to be easily inserted through screw rod insertion holes 90, 86 and 88 in the mirror mounting portion 60 (FIGS. 5 and 6). A tip of the boss 27 is tapered so as to be easily inserted through a boss insertion hole 80 in the mirror mounting portion 60.

Figure 3:
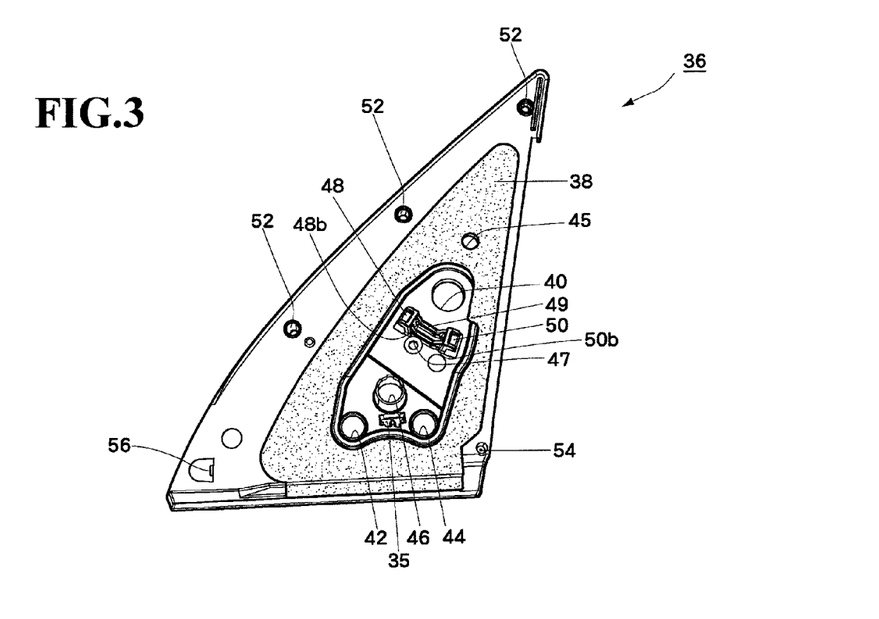
FIG. 3 is a perspective view of a gasket viewed from a surface facing the mirror mounting portion of a vehicle body.

FIG. 3 shows the gasket which is to be mounted to the vehicle body mounting surface 16a of the base body 16, viewed from a surface facing the vehicle body. The gasket 36 is made of relatively soft plastic such as PE (polyethylene), and sponge packing is bonded to a partial area of the gasket 36 in the surface facing the vehicle body. In the gasket 36, a screw rod insertion hole 40 through which the upper screw rod 22 is inserted, screw rod insertion holes 42 and 44 through which the lower screw rods 24 and 26 are inserted, a boss insertion hole 45 through which the boss 27 is inserted, a harness insertion hole 46 through which the harness 28 is inserted, and a screw insertion hole 47 through which the screw 58 (FIG. 4) for securing the gasket 36 to the base body 16 is inserted are formed. In the surface of the gasket 36 facing the vehicle body, two temporary fixing pieces 48 and 50 are formed to protrude integrally with the gasket 36 with a lateral space therebetween in a position closer to the upper screw rod insertion hole 40 in a position between the upper screw rod insertion hole 40 and the lower screw rod insertion holes 42 and 44. Near the peripheral edge of the gasket 36, a hole 52 into which the boss 32 of the cover 18 (FIG. 2) is fitted and fastened, a hole 54 into which the protrusion 33 is inserted and fastened, and a locking piece 56 locked and fastened to the locking portion 34 are formed.

Figure 4:
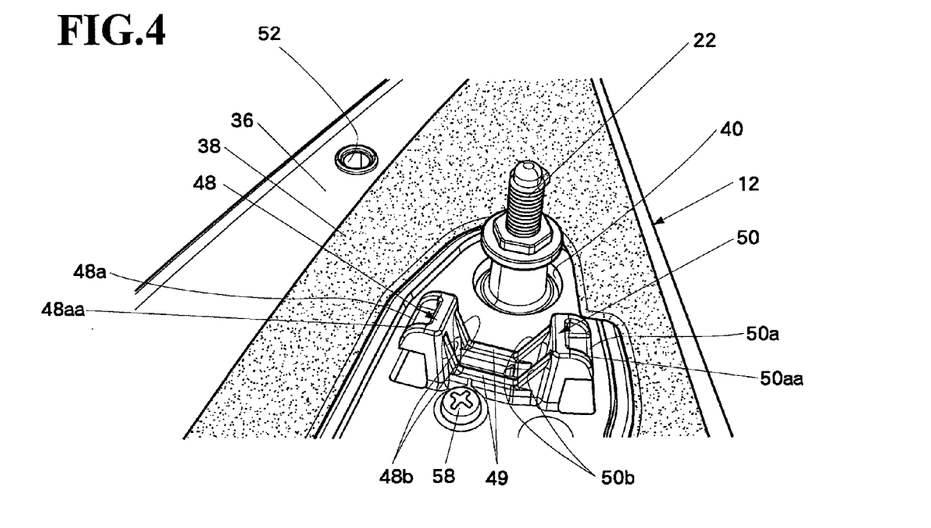
FIG. 4 is a partially enlarged perspective view showing a state where a gasket 36 in FIG. 3 is mounted to a mirror base 12 of the door mirror 10 in FIG. 2.

FIG. 4 shows a partial enlarged view of a state where the gasket 36 is mounted to the mirror base 12 of the door mirror 10. The gasket 36 is secured to the base body 16 by threading one screw 58 into the screw hole 31 (FIG. 2) in the base body 16 through the screw insertion hole 47 (FIG. 3) in the gasket 36. The peripheral edge of the gasket 36 is fastened to the peripheral edge of the mirror base 12 by fitting the boss 32 (FIG. 2) into the hole 52 (FIG. 3), fitting the protrusion 33 (FIG. 2) into the hole 54 (FIG. 3), and locking the locking piece 56 (FIG. 3) to the locking portion 34 (FIG. 2). As such, the door mirror 10 is mounted to the vehicle body with the gasket 36 being previously secured to the base body 16. Pawls 48a and 50a are formed to direct outward at tips of the temporary fixing pieces 48 and 50. Ribs 48b and 50b are formed integrally with the temporary fixing pieces 48 and 50 so as to direct inward on facing surfaces of the temporary fixing pieces 48 and 50. Lower portions of the ribs 48b and 50b are connected each other by a rib connecting portion 49 constituted by a ridge formed on a plate surface of the gasket 36. The rib connecting portion 49 increases rigidity of the plate surface of the gasket 36 in a position between the ribs 48b and 50b, prevents the plate surface of the gasket 36 from being bent in a position between the ribs 48b and 50b in temporarily fixing the temporary fixing pieces 48 and 50 to edges 82a and 82b of an opening 82, and thus prevents the temporary fixing pieces 48 and 50 from coming off from the edges 82a and 82b.

A configuration of the mirror mounting portion to which the door mirror 10 is mounted will be described. FIG. 5 shows the mirror mounting portion 60 viewed from the outdoor side, and FIG. 6 shows the mirror mounting portion 60 viewed from the indoor side. The mirror mounting portion 60 has a triangular shape and is placed in a triangular corner of a front door 62 of the vehicle. The mirror mounting portion 60 has a structure in which an outer plate 64 made of a steel sheet and placed on the outdoor side and an inner plate 66 made of a steel sheet and placed on the indoor side are placed to face each other with an appropriate space therebetween. The mirror mounting portion 60 is welded to an outside panel 68, an inside panel 70, a main frame 72, and a lower frame 74 that are components of the front door 62 and surround the mirror mounting portion 60 and are all made of steel sheets. A rubber weather strip 76 is mounted to an outer peripheral edge of the main frame 72. A side window glass 78 is placed in an area adjacent to a vehicle rear side of the mirror mounting portion 60.

In the outer plate 64 (FIG. 5) of the mirror mounting portion 60, the boss insertion hole 80 through which the boss 27 is inserted, the opening 82 through which the screw rod 22 is inserted without contact and the temporary fixing pieces 48 and 50 are inserted, the harness insertion hole 84 through which the harness 28 is inserted, and screw rod insertion holes 86 and 88 through which the screw rods 24 and 26 are inserted are formed. The boss insertion hole 80 is sized so that the boss 27 cannot be radially moved (although the mirror base 12 can be rotated around the boss 27 with the boss 27 being inserted into the boss insertion hole 80). The opening 82 has a vertically elongated oval shape so that the screw rod 22 and the temporary fixing pieces 48 and 50 can be inserted together through the opening 82. Thus, the temporary fixing pieces 48 and 50 can be placed in a position close to the upper screw rod 22, that is, a position in a relatively upper portion of the mirror base 12, thereby allowing the door mirror 10 to be stably temporarily fixed. Specifically, in case the door mirror 10 is temporarily fixed and the temporary fixing is released by the weight of the door mirror 10 and the door mirror falls off from the mirror mounting portion 60, the door mirror 10 is rotated around the lower position of the mirror base 12 where the screw rods 24 and 26 are inserted through the screw rod insertion holes 86 and 88 and the door mirror falls off. Thus, by temporarily fixing the door mirror 10 in the upper portion of the mirror base 12 as remote as possible from the center of rotation, a load applied to the temporary fixing pieces 48 and 50 (moment force applied to the temporary fixing pieces 48 and 50 around the lower position of the mirror base 12) by the weight of the door mirror 10 can be reduced, and the fall of the door mirror 10 can be prevented.

The screw rod insertion hole 86 in the outer plate 64 is formed into an oval shape having a long diameter in a direction of a line connecting the screw rod insertion hole 86 and the boss insertion hole 80 and a short diameter in a direction perpendicular to the line. The short diameter is sized so that the screw rod 24 inserted through the screw rod insertion hole 86 cannot be moved in a direction of the short diameter and the long diameter is sized so that the screw rod 24 inserted through the screw rod insertion hole 86 can be moved in a direction of the long diameter. Meanwhile, the screw rod insertion hole 88 is formed into a circular shape sized so that the screw rod 26 inserted through the screw rod insertion hole 88 can be radially moved (specifically, the screw rod 26 is easily inserted).

In an inner plate 66 (FIG. 6) of the mirror mounting portion 60, a screw rod insertion hole 90 through which the screw rod 22 is inserted, and an opening 92 through which the harness insertion hole 84 and the screw rod insertion holes 86 and 88 in the outer plate 68 are exposed to the indoor side are formed. The screw rod insertion hole 90 is sized so that the screw rod 22 can be radially moved (specifically, the screw rod 22 is easily inserted).

A procedure of mounting the door mirror 10 to the mirror mounting portion 60 will be described.

(1) Before the door mirror 10 is mounted to the mirror mounting portion 60, the gasket 36 (FIG. 3) is previously secured to the vehicle body mounting surface 16a of the mirror base 12 of the door mirror 10 (FIG. 2) by the screw 58 (FIG. 4).

Figure 1:
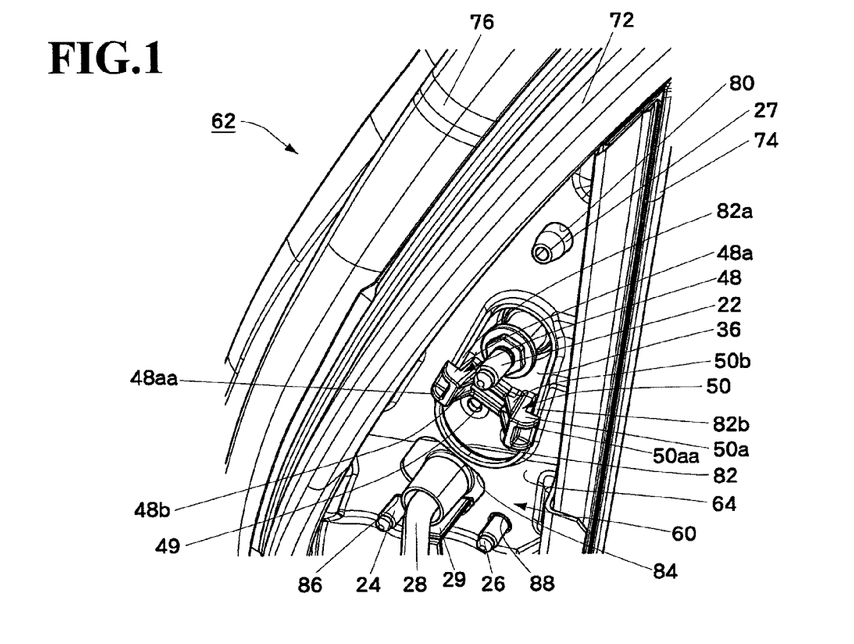
FIG. 1 shows an embodiment of the present invention, and is a perspective view showing a state where a door mirror 10 in FIG. 2 is temporarily fixed to a mirror mounting portion in FIGS. 5 and 6 with an inner plate 66 being removed.

(2) The mirror base 12 is pressed against and temporarily fixed to the mounting surface 60a on the outdoor side of the mirror mounting portion 60. FIG. 1 shows the temporarily fixed state with the inner plate 66 being removed. The temporary fixing is performed by the following procedure.

i) The harness 28 is inserted through the harness insertion hole 84 exposed through the opening 92 in the inner plate 66.

ii) The mirror base 12 is placed to face the mounting surface 60a of the mirror mounting portion 60 so as to be slightly tilted forward to the mounting surface 60a, and the boss 27 is slightly inserted into the boss insertion hole 80 to position the upper portion of the mirror base 12. At this time, the screw rod 22 is inserted into an upper area of the opening 82 in the outer plate 64. In this state, the mirror base 12 is moved in a rotational direction around the boss 27, and the screw rod 24 is positioned and slightly inserted into the screw rod insertion hole 86. Though the screw rod insertion hole 86 has the oval shape, the direction of the short diameter matches the rotational direction of the mirror base 12 around the boss 27, and thus the mirror base 12 is restricted in movement in the rotational direction around the boss 27. Thus, the mirror base 12 is positioned in the direction along the mounting surface 60a (in vertical and lateral directions). In this state, the mirror base 12 is placed in parallel with the mounting surface 60a and slightly pressed against the mounting surface 60a, and thus the remaining screw rods 22 and 26 are slightly inserted into the screw rod insertion holes 90 and 88. The screw rod 22 can be radially moved in the screw rod insertion hole 90, and the screw rod 26 can be radially moved in the screw rod insertion hole 88, and thus the screw rods 22 and 26 are easily inserted into the screw rod insertion holes 90 and 88. As such, front end surfaces 48aa and 50aa of the pawls 48a and 50a of the temporary fixing pieces 48 and 50 are abutted against the laterally facing edges 82a and 82b of the opening 82. Lengths of the boss 27 and the screw rods 22, 24 and 26 are set so that the front end surfaces 48aa and 50aa of the pawls 48a and 50a of the temporary fixing pieces 48 and 50 are abutted against the edges 82a and 82b of the opening 82 with the boss 27 and the screw rods 22, 24 and 26 being inserted midway into the insertion holes 80, 90, 86 and 88 in the outer plate 64.

iii) When the mirror base 12 is further strongly pressed against the mounting surface 60a, the front end surfaces 48aa and 50aa of the pawls 48a and 50a of the temporary fixing pieces 48 and 50 are pressed and abutted against the edges 82a and 82b of the opening 82, and the temporary fixing pieces 48 and 50 are brought inward and inserted into the opening 82 beyond the edges 82a and 82b by flexibility (elastic deformation) of the temporary fixing pieces 48 and 50 and the plate surface of the gasket 36. Since the mirror base 12 is thus pressed with the mirror base 12 being positioned in the direction along the mounting surface 60a, the temporary fixing pieces 48 and 50 can be easily inserted into the opening 82. The pawls 48a and 50a of the temporary fixing pieces 48 and 50 and the tip of the boss 27 are placed in a space 65 (FIG. 8) between the inner plate 66 and the outer plate 64.

iv) When the insertion is finished, the pawls 48a and 50a of the temporary fixing pieces 48 and 50 are locked to the edges 82a and 82b of the opening 82. In this state, the mirror base 12 is restricted in movement along the mounting surface 60a by fitting between the boss 27 and the boss insertion hole 80 and fitting between the screw rod 24 and the screw rod insertion hole 86, and restricted in movement in a direction apart from the mounting surface 60a of the mirror mounting portion 60 by engagement between the pawls 48a and 50a of the temporary fixing pieces 48 and 50 and the edges 82a and 82b of the opening 82, and thus the mirror base 12 is correctly positioned and temporarily fixed. Thus, even if a hand is taken off from the door mirror 10, the door mirror 10 does not fall off from the mirror mounting portion 60. In particular, the temporary fixing pieces 48 and 50 are reinforced by the ribs 48b and 50b so as not to be excessively bent, and the rib connecting portion 49 connecting the ribs 48b and 50b increases rigidity of the plate surface of the gasket 36 in the position between the ribs 48b and 50b to prevent the plate surface from being bent. This prevents the pawls 48a and 50a from being disengaged from the edges 82a and 82b of the opening 82, and more reliably prevents the door mirror 10 from falling off from the mirror mounting portion 60.

Figure 7:
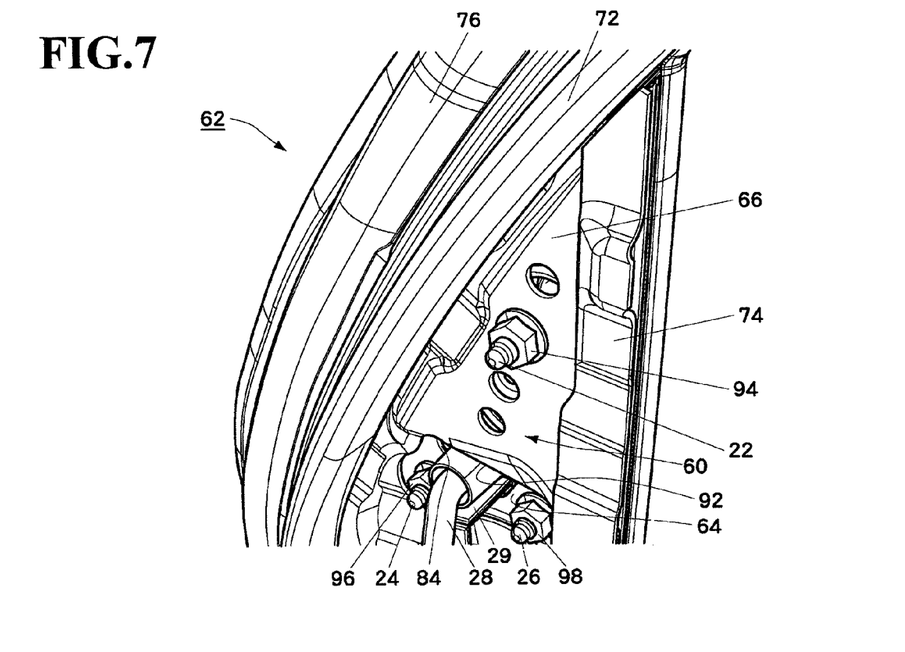
FIG. 7 is a perspective view showing a state where the door mirror 10 in FIG. 2 is mounted to the mirror mounting portion 60 in FIGS. 5 and 6.
Figure 8:
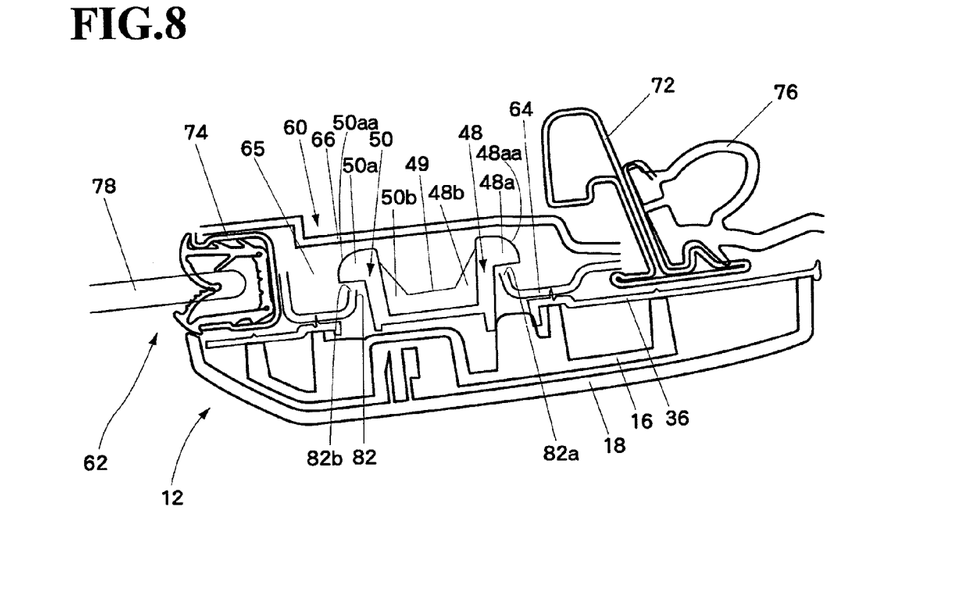
FIG. 8 is a sectional view of temporary fixing pieces 48 and 50 and therearound in the state in FIG. 7.

(3) As shown in FIG. 7, a nut 94 is threaded and fastened onto the screw rod 22 on the inner plate 66, and nuts 96 and 98 are threaded and fastened onto the screw rods 24 and 26 on the outer plate 64 through the opening 92 in the inner plate 66, and thus the mirror base 12 is permanently fixed to the mirror mounting portion 60. FIG. 8 shows a section of the temporary fixing pieces 48 and 50 and therearound at this time.

(4) An interior plate (garnish) is mounted to the surface of the inner plate 66, and mounting of the door mirror 10 is finished. In FIG. 7, a squarely bent plate material 29 placed under the harness 28 supports the harness 28. The plate material 29 is made of plastic, and has one end inserted into an insertion hole 35 formed in the gasket 36 and mounted to the gasket 36.

In the embodiment, the mirror mounting portion 60 is constituted by the two plates 64 and 66 but may be constituted by one plate.

What is claimed is:

1. A mounting portion structure of a door mirror in which a mirror base of a door mirror is mounted via a gasket to a mounting surface on an outdoor side of a mirror mounting portion placed on a vehicle door,
    wherein the gasket includes two elastically deformable temporary fixing pieces formed to protrude to face each other with a space therebetween on a surface facing the mirror mounting portion, and rotatable pawls formed to direct outward at tips of the two temporary fixing pieces,
    the mirror mounting portion includes an opening through which the two elastically deformable temporary fixing pieces are inserted and that locks and temporarily fixes the pawls of the temporary fixing pieces to facing edges,
    the gasket is previously secured to the mirror base, the mirror base is temporarily fixed to the mirror mounting portion, and the mirror base and the mirror mounting portion are fixed by a screw to mount the mirror base to the mirror mounting portion,
    wherein the mirror base has a structure in which a boss is provided to stand on a surface facing the mirror mounting portion,
    the gasket includes a boss insertion hole through which the boss is inserted,
    the mirror mounting portion includes a boss insertion hole through which the boss protruding through the boss insertion hole in the gasket is inserted.

2. A mounting portion structure of a door mirror in which a mirror base of a door mirror is mounted via a gasket to a mounting surface on an outdoor side of a mirror mounting portion placed on a vehicle door,
    wherein the gasket includes two elastically deformable temporary fixing pieces formed to protrude to face each other with a space therebetween on a surface facing the mirror mounting portion, and rotatable pawls formed to direct outward at tips of the two temporary fixing pieces,
    the mirror mounting portion includes an opening through which the two elastically deformable temporary fixing pieces are inserted and that locks and temporarily fixes the pawls of the temporary fixing pieces to facing edges,
    the gasket is previously secured to the mirror base, the mirror base is temporarily fixed to the mirror mounting portion, and the mirror base and the mirror mounting portion are fixed by a screw to mount the mirror base to the mirror mounting portion,
    wherein the mirror mounting portion has a structure in which an outer plate placed on the outdoor side and an inner plate placed on an indoor side are placed to face each other with an appropriate space therebetween,
    the gasket is arranged between the mirror base and the outer plate,
    the outer plate includes the opening through which the two temporary fixing pieces are inserted.

3. A mounting portion structure of a door mirror in which a mirror base of a door mirror is mounted via a gasket to a mounting surface on an outdoor side of a mirror mounting portion placed on a vehicle door,
    wherein the gasket includes two temporary fixing pieces formed to protrude to face each other with a space therebetween on a surface facing the mirror mounting portion, and pawls formed to direct outward at tips of the two temporary fixing pieces,
    the mirror mounting portion includes an opening through which the two temporary fixing pieces are inserted and that locks and temporarily fixes the pawls of the temporary fixing pieces to facing edges,
    the gasket is previously secured to the mirror base, the mirror base is temporarily fixed to the mirror mounting portion, and the mirror base and the mirror mounting portion are fixed by a screw to mount the mirror base to the mirror mounting portion,
    wherein the mirror mounting portion has a substantially triangular shape,
    the mirror base has a structure in which one upper screw rod, two lower left and right screw rods, and one boss on a portion above the upper screw rod are provided to stand on a substantially triangular surface facing the mirror mounting portion,
    the gasket includes a boss insertion hole through which the boss is inserted, upper and lower screw rod insertion holes through which the upper and lower screw rods are inserted, the two temporary fixing pieces formed to protrude to face each other with a lateral space therebetween on the surface facing the mirror mounting portion in a position between the upper and lower screw rod insertion holes, and the pawls formed to direct outward at tips of the two temporary fixing pieces,
    the mirror mounting portion includes a boss insertion hole through which the boss protruding through the boss insertion hole in the gasket is inserted, two screw rod insertion holes through which the two lower screw rods protruding through the lower screw rod insertion hole in the gasket are inserted, a screw rod insertion hole through which the one upper screw rod protruding through the upper screw rod insertion hole in the gasket is inserted, and the opening through which the two temporary fixing pieces are inserted and that locks and temporarily fixes the pawls of the temporary fixing pieces to laterally facing edges in a position below the upper screw rod,
    the one boss and the three screw rods are inserted midway into the insertion holes in the mirror mounting portion to abut front end surfaces of the pawls of the two temporary fixing pieces against the laterally facing edges of the opening, in this state, the mirror base is pressed against the mirror mounting portion to lock the pawls of the two temporary fixing pieces to the laterally facing edges of the opening beyond the laterally facing edges to temporarily fix the mirror base to the mirror mounting portion, and nuts are threaded and fastened onto the three screw rods with the mirror base being temporarily fixed to the mirror mounting portion to mount the mirror base to the mirror mounting portion.

4. The mounting portion structure of a door mirror according to claim 3, wherein ribs are formed on facing surfaces of the two temporary fixing pieces.

5. A mounting portion structure of a door mirror in which a mirror base of a door mirror is mounted via a gasket to a mounting surface on an outdoor side of a mirror mounting portion placed on a vehicle door, wherein the gasket includes two temporary fixing pieces formed to protrude to face each other with a space therebetween on a surface facing the mirror mounting portion, and pawls formed to direct outward at tips of the two temporary fixing pieces, the mirror mounting portion includes an opening through which the two temporary fixing pieces are inserted and that locks and temporarily fixes the pawls of the temporary fixing pieces to facing edges, the gasket is previously secured to the mirror base, the mirror base is temporarily fixed to the mirror mounting portion, and the mirror base and the mirror mounting portion are fixed by a screw to mount the mirror base to the mirror mounting portion, wherein the mirror base includes upper and lower screw rods provided to stand with a space therebetween and a boss provided to stand on a portion above the upper screw rod on a surface facing the mirror mounting portion, the gasket includes a boss insertion hole through which the boss is inserted, upper and lower screw rod insertion holes through which the upper and lower screw rods are inserted, the two temporary fixing pieces formed to protrude to face each other with a lateral space therebetween on the surface facing the mirror mounting portion in a position between the upper and lower screw rod insertion holes, and the pawls formed to direct outward at tips of the two temporary fixing pieces, the mirror mounting portion has a structure in which an outer plate placed on the outdoor side and an inner plate placed on an indoor side are placed to face each other with an appropriate space therebetween, the outer plate includes a boss insertion hole through which the boss protruding through the boss insertion hole in the gasket is inserted, a screw rod insertion hole through which the lower screw rod protruding through the lower screw rod insertion hole in the gasket is inserted, and the opening through which the upper screw rod protruding through the upper screw rod insertion hole in the gasket and the two temporary fixing pieces are inserted together and that locks and temporarily fixes the pawls of the temporary fixing pieces to laterally facing edges, the inner plate includes a screw rod insertion hole through which the upper screw rod protruding through the opening in the outer plate is inserted, and an opening through which the lower screw rod protruding through the screw rod insertion hole in the outer plate is exposed to the indoor side, with the gasket previously secured to the mirror base, the boss of the mirror base is inserted through the boss insertion hole in the outer plate, the lower screw rod is inserted through the screw rod insertion hole in the outer plate, the upper screw rod is inserted through the screw rod insertion hole in the inner plate through the opening in the outer plate, the two temporary fixing pieces are inserted through the opening in the outer plate and the pawls of the temporary fixing pieces are locked to the laterally facing edges of the opening to temporarily fix the mirror base to the mirror mounting portion, a nut is threaded and fastened onto the upper screw rod protruding through the screw rod insertion hole in the inner plate with the mirror base being temporarily fixed to the mirror mounting portion, and a nut is threaded and fastened onto the lower screw rod protruding through the screw rod insertion hole in the outer plate and exposed through the opening in the inner plate to mount the mirror base to the mirror mounting portion.

6. The mounting portion structure of a door mirror according to claim 5, wherein the lower screw rod consists of two screw rods arranged in the lateral direction and the screw rod insertion hole in the outer plate consists of two holes through which the two screw rods are inserted, one of the two screw rod insertion holes in the outer plate through which the two screw rods are inserted is formed into an oval shape having a long diameter in a direction of a line connecting the one screw rod insertion hole and the boss insertion hole and a short diameter in a direction perpendicular to the line, the short diameter is sized so that the screw rod inserted through the screw rod insertion hole cannot be moved in a direction of the short diameter and the long diameter is sized so that the screw rod inserted through the screw rod insertion hole can be moved in a direction of the long diameter, the other of the two screw rod insertion holes is formed into a circular shape sized so that the screw rod inserted through the screw rod insertion hole can be radially moved, and the boss insertion hole in the outer plate is sized so that the boss inserted through the boss insertion hole cannot be radially moved.

7. The mounting portion structure of a door mirror according to claim 5, wherein ribs are formed on facing surfaces of the two temporary fixing pieces.

8. The mounting portion structure of a door mirror according to claim 6, wherein ribs are formed on facing surfaces of the two temporary fixing pieces.

* * * * *